US008844250B2

(12) United States Patent
Nemkov et al.

(10) Patent No.: US 8,844,250 B2
(45) Date of Patent: Sep. 30, 2014

(54) SEALING DEVICE AND METHOD FOR PRODUCING SEALED PACKAGES OF A POURABLE FOOD PRODUCT

(75) Inventors: Valentin S. Nemkov, White Lake, MI (US); Nikolay Madzharov, Drianovo (BG); Gerhard Gnad, Keltern (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 1656 days.

(21) Appl. No.: 12/299,192

(22) PCT Filed: May 29, 2006

(86) PCT No.: PCT/IB2006/001395
§ 371 (c)(1),
(2), (4) Date: Oct. 31, 2008

(87) PCT Pub. No.: WO2007/138372
PCT Pub. Date: Dec. 6, 2007

(65) Prior Publication Data
US 2009/0090088 A1    Apr. 9, 2009

(51) Int. Cl.
*B65B 51/10*    (2006.01)
*B65B 9/00*    (2006.01)

(52) U.S. Cl.
USPC .......................................... 53/477; 53/376.2

(58) Field of Classification Search
USPC ..................... 53/375.9, 376.2, 552, 451, 477
See application file for complete search history.

(56) References Cited

U.S. PATENT DOCUMENTS 4,637,199 A * 1/1987 Steck et al. .................... 53/451

FOREIGN PATENT DOCUMENTS

| EP | 1234772 A1 | 8/2002 |
|---|---|---|
| JP | 62-184793 A | 8/1987 |
| JP | 2002-152997 A | 5/2002 |
| JP | 2002-272134 A | 9/2002 |
| JP | 2002-308204 A | 10/2002 |
| JP | 2002-320343 A | 10/2002 |
| JP | 2002-359902 A | 12/2002 |
| WO | WO 00/64662 A2 | 11/2000 |
| WO | WO 2006/048441 A1 | 5/2006 |

OTHER PUBLICATIONS

Form PCT/ISA/210 (International Search Report) dated Jan. 9, 2007.
Form PCT/ISA/237 (Written Opinion of the International Searching Authority) dated Jan. 9, 2007.
English translation of Japanese Official Action dated Nov. 29, 2011 issued in the corresponding Japanese Patent Application No. 2009-512687.

* cited by examiner

*Primary Examiner* — Alexandra Elve
*Assistant Examiner* — John Paradiso
(74) *Attorney, Agent, or Firm* — Buchanan Ingersoll & Rooney PC

(57) ABSTRACT

A sealing device for producing sealed packages from a tube of packaging material fed along a path and filled with a pourable food product, comprising: a frame; a pair of jaws movable cyclically with respect to the frame and along part of the path to grip the tube; ultrasonic sealing means carried by a first jaw to seal the tube; and power means including a primary winding fixed to the frame and connectable to an electric energy source, and a secondary winding carried by the first jaw, supplying the sealing means, and receiving electric energy by electromagnetic induction from the primary winding as the first jaw travels past the primary winding; and the device having transformer means supplied by the electric energy source with a first voltage value, and supplying the primary winding with a second voltage value lower than the first voltage value.

12 Claims, 4 Drawing Sheets

SEALING DEVICE AND METHOD FOR PRODUCING SEALED PACKAGES OF A POURABLE FOOD PRODUCT

TECHNICAL FIELD

The present invention relates to a sealing device and method for producing sealed packages of a pourable food product.

BACKGROUND ART

As is known, many pourable food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material. More specifically, the web of packaging material is unwound off a reel and fed through an aseptic chamber on the packaging machine, where it is sterilized, e.g. by applying a sterilizing agent such as hydrogen peroxide, which is subsequently evaporated by heating, and/or by subjecting the packaging material to radiation of appropriate wavelength and intensity; and the sterilized web is maintained in a closed, sterile environment, and is folded into a cylinder and sealed longitudinally to form a continuous tube in known manner.

The tube of packaging material, which in effect forms an extension of the aseptic chamber, is fed in a vertical direction, is filled with the sterilized or sterile-processed food product, and is fed through a sealing device to form the individual packages. More specifically, in the sealing device, the tube is sealed at a number of equally spaced cross sections to form pillow packs connected to one another by transverse sealing strips, i.e. extending perpendicularly to the travelling direction of the tube. The pillow packs are separated from one another by cutting the relative transverse sealing strips, and are conveyed to a folding station where they are folded mechanically to form respective finished parallelepiped-shaped packages.

Packaging machines are known, as described for example in European Patent EP-B-0887265, which comprise two chain conveyors defining respective endless paths and fitted with respective numbers of sealing jaws. The two paths have respective branches substantially facing and parallel to each other, and between which the tube of packaging material is fed so that the jaws on one conveyor cooperate with corresponding jaws on the other conveyor along said branches of the respective paths, to grip the tube at a number of successive cross sections, and to seal and cut the packs.

Packaging machines are also known comprising only two pairs of jaws, which act alternately on the tube of packaging material to grip and seal, e.g. heat seal, it along a number of equally spaced cross sections.

As the sealing operation is completed, a cutter, carried for example by one of the jaws in each pair, is activated, and interacts with the tube of packaging material to cut it along a centreline of the cross section just sealed, and so detach a pillow pack from the bottom end of the tube of packaging material. The bottom end being sealed transversely, the relative jaws, on reaching the bottom dead-centre position, can be opened to avoid interfering with the top portion of the tube. At the same time, the other pair of jaws, operated in exactly the same way, moves down from the top dead-centre position, and repeats the above grip/form, seal and cut process.

On both types of packaging machines, the tube portion gripped between each pair of jaws is typically sealed by heating means carried by one of the jaws, and which locally melt the layers of heat-seal plastic material gripped tightly between the jaws.

To reduce the time taken to melt the packaging material locally, and so increase package output, heating means comprising ultrasonic sealing devices are widely used.

As described, for example, in EP-B-615907, such devices substantially comprise a mechanical-vibration generator or sonotrode, and an anvil, which are fitted to respective jaws in each pair, and cooperate with each other to heat the packaging material by ultrasonic vibration.

More specifically, a sonotrode is a sealing tool which is vibrated by one or more disks of piezoelectric material. The disks are supplied with alternating voltage, and generate mechanical vibration, the energy of which is related to the effective voltage or electric current supply value.

More specifically, for correct, complete sealing, the sonotrode must be supplied with a particularly high voltage, e.g. of about a thousand volts.

Being movable with the relative jaws, the sonotrodes must be powered electrically by an electric energy source fixed in a given position along the path of the tube of packaging material.

In other words, electric energy must be transferred from a fixed source to a moving user device along a portion of the path traveled by the user device.

This can be done in known manner by equipping the jaws supporting the sonotrodes with brushes, preferably made of carbon, which, along a predetermined portion of the path traveled by the brushes, slide along respective copper power supply bars fixed to the packaging machine frame.

Rapid wear of the brushes and unstable contact between the brushes and the power supply bars are the major drawbacks of this method, and which tend to get worse as the output rate of the packaging machine increases.

To eliminate these drawbacks, it has been proposed, as described for example in EP-04105565, to employ a method based on transferring electric energy from the fixed source to the moving user device by electromagnetic induction.

Electric energy is transferred from a transmitting unit, fixed to the packaging machine frame, to a receiving unit fitted to one of the jaws in a relative pair.

The transmitting unit has a fixed magnetic core fitted with a primary winding connected to the electric energy source, while the receiving unit has a movable magnetic core integral with the body of the relative jaw and fitted with a secondary winding connected to the relative sonotrode.

More specifically, the electric energy source is a voltage generator, which supplies the primary winding to generate in it an electric current and associated magnetic field which, as the receiving unit travels past the transmitting unit, induces electric current in the secondary winding to supply the sonotrode.

There being no contact between the receiving and transmitting units, the above method solves the wear problem.

On the other hand, known induction electric energy transfer systems are unsatisfactory in that, for correct, complete sealing, the sonotrode would have to be supplied with particularly high voltage, which would have to be transferred by induction from the primary to the secondary winding.

Since, in operating conditions, the environment between the primary and secondary windings is damp and contaminated with conducting substances, such transfer would entail a high risk of electric discharges on the primary and secondary windings, thus possibly resulting in damage to and impaired operation of the packaging machine.

The Applicant has found this to be particularly so in the case of the primary winding, which has extensive exposed surfaces, to reduce the effects of nonhomogeneous electric current distribution (known as "skin effect") and is therefore difficult to insulate.

Induction transfer systems are also unsatisfactory on account of the electric energy supplied by the voltage source being supplied to the primary winding largely in the form of voltage and to a lesser degree in the form of electric current, whereas the electric current induced in the secondary winding and, therefore, the voltage supplying the sonotrode are proportional the electric current flow in the primary winding.

DISCLOSURE OF THE INVENTION

It is an object of the present invention to provide a sealing device for producing sealed packages of a pourable food product, designed to ensure complete, correct sealing of the packages, while at the same time providing a straightforward, low-cost solution to the aforementioned drawbacks typically associated with known sealing devices.

According to the present invention, there is provided a sealing device for producing sealed packages of a pourable food product, said sealing device comprising:

a supporting frame;
at least one pair of opposite jaws movable cyclically with respect to said frame and along part of a path to grip a tube of packaging material tightly at equally spaced cross sections;
ultrasonic sealing means carried by a first of said jaws to seal said tube of packaging material at said cross sections; and
electromagnetic power means for supplying electric energy to said sealing means, said power means comprising at least a primary winding fixed to said frame alongside said path and connectable to an electric energy source; and a secondary winding carried by said first jaw, supplying said sealing means, and receiving electric energy by electromagnetic induction from said primary winding as said first jaw travels past the primary winding;
and being characterized by comprising transformer means supplied by said electric energy source with a first voltage value, and supplying said primary winding with a second voltage value lower than said first voltage value.

The present invention also relates to a sealing method for producing sealed packages from a tube of sheet packaging material fed along a path and filled continuously with a pourable food product; the method comprising the steps of:

moving a pair of opposite jaws cyclically with respect to a supporting frame and along part of said path to grip said tube of packaging material tightly at equally spaced cross sections;
sealing said tube of packaging material at said cross sections by means of ultrasonic sealing means;
supplying electric energy to said sealing means by means of power means, said power means comprising at least a primary winding fixed to said frame alongside said path and connectable to an electric energy source; and a secondary winding carried by said first jaw, supplying said sealing means, and receiving electric energy by electromagnetic induction from said primary winding as said first jaw travels past the primary winding;
and being characterized by comprising the step of supplying transformer means, by means of said electric energy source, with a first voltage value, and supplying said primary winding, by means of said transformer means, with a second voltage value lower than said first voltage value.

BRIEF DESCRIPTION OF THE DRAWINGS

A preferred, non-limiting embodiment of the present invention will be described by way of example with reference to the accompanying drawings, in which:

FIG. 4 shows a larger-scale view in perspective of a detail in FIG. 3;

BEST MODE FOR CARRYING OUT THE INVENTION

Figure 1:
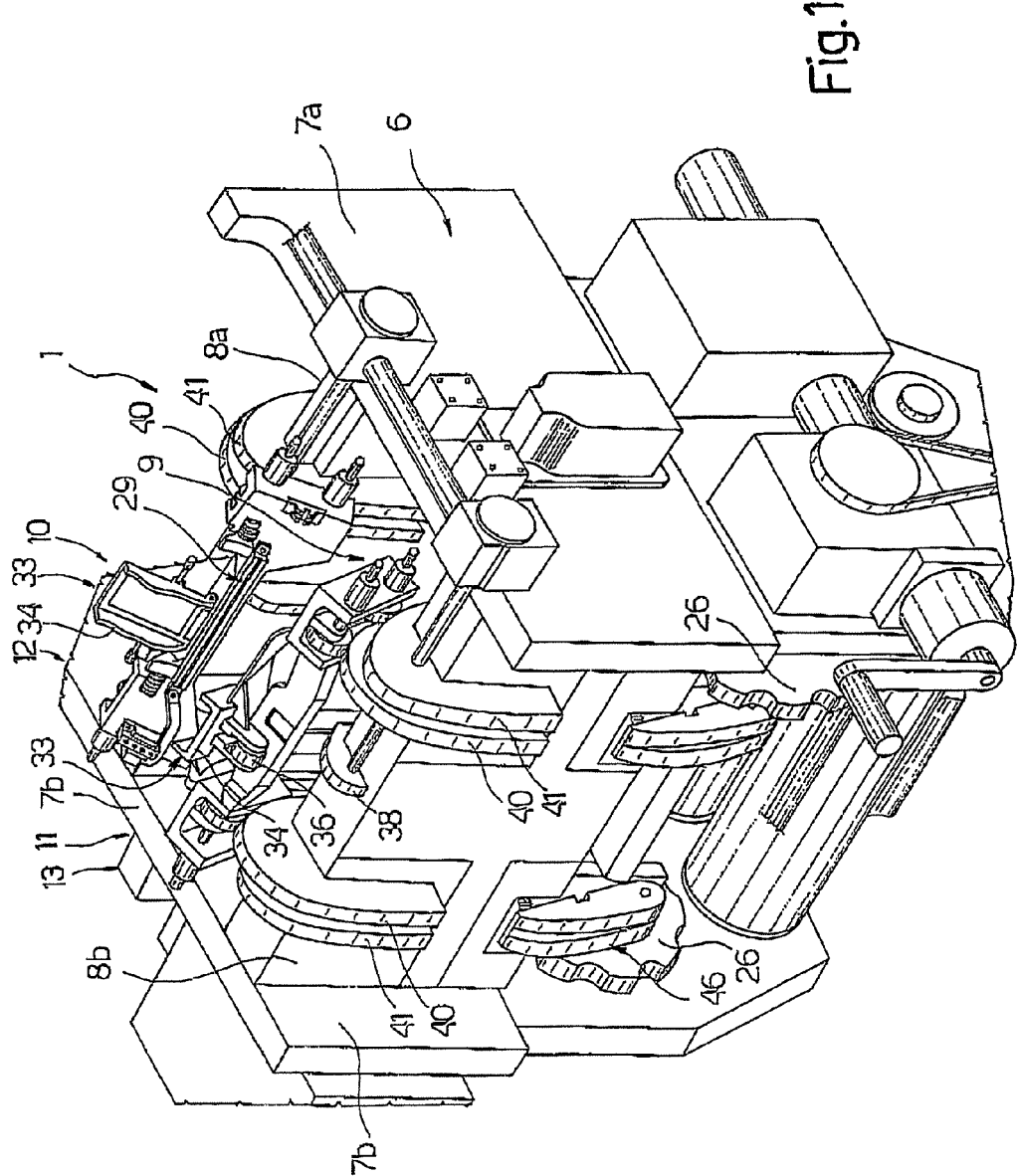
FIG. 1 shows a view in perspective, with parts removed for clarity, of a sealing device in accordance with the teachings of the present invention.
Figure 2:
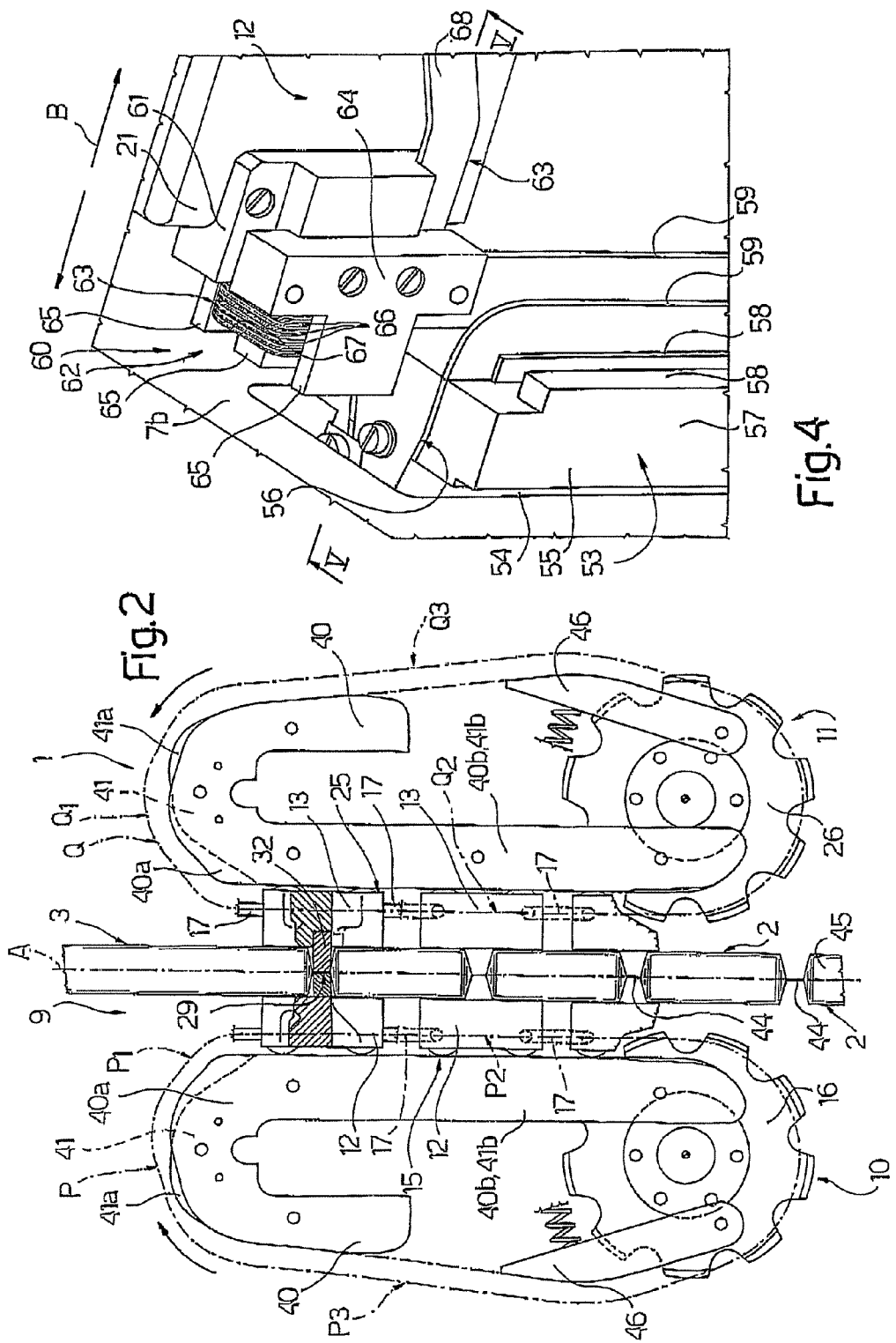
FIG. 2 shows a schematic side view of the FIG. 1 sealing device.

Number 1 in FIGS. 1 and 2 indicates as a whole a sealing device for continuously producing sealed packages 2 of a pourable food product, such as pasteurized or UHT milk, fruit juice, wine, etc., from a tube 3 of packaging material.

Tube 3 is formed in known manner upstream from device 1 by longitudinally folding and sealing a web of heat-seal sheet material, and is filled with the sterilized or sterile-processed food product for packaging.

Device 1 comprises a frame 6 (FIGS. 1 and 3) defined by two sides 7a, 7b, and by two parallel transverse walls 8a, 8b fixed rigidly between sides 7a, 7b to define, with sides 7a, 7b, a cavity 9; and two chain conveyors 10, 11 fitted to frame 6 and having respective jaws 12, 13 (only one pair shown in FIG. 1) which cooperate with one another to interact with tube 3 of packaging material fed along a vertical path A through cavity 9.

With particular reference to FIG. 2, conveyors 10, 11 define respective endless paths P, Q, along which jaws 12, 13 are fed, and which extend respectively about walls 8a, 8b of frame 6.

Conveyor 10 comprises an articulated chain 15 extending along path P; and two drive wheels 16 meshing with both sides of chain 15 at the bottom end of path P. Jaws 12 are an integral part, and define alternate links, of chain 15, and are connected to one another in articulated manner by pairs of rods 17.

More specifically (FIG. 3), each jaw 12 comprises a main body 20, which is elongated in a direction B (shown in FIGS. 4 and 5) perpendicular to path A and to sides 7a, 7b, and has respective end enlargements 21, 22, from each of which project a first and second pin 23, 24 having axes C, D spaced apart and parallel to direction B. Rods 17 pivot on pins 23, 24 of jaws 12 to connect pins 23 of one jaw 12 to pins 24 of the adjacent jaw 12.

In the same way, conveyor 11 (FIGS. 1 and 2) comprises an articulated chain 25 extending along path Q; and two drive wheels 26 meshing with chain 25 at the bottom end of path Q. Chain 25 is defined by a number of jaws 13 connected to one another in articulated manner, and only described in detail insofar as they differ from jaws 12 and as required for a clear understanding of the present invention. Parts of jaws 13 identical or corresponding to parts of jaws 12 described are indicated using the same reference numbers. Briefly, each jaw 13 comprises a main body 20 having pairs of end pins 23, 24, on which pivot rods 17 connecting adjacent pairs of jaws 13.

Jaws 12 and 13 are fitted respectively with a mechanical-vibration generator or sonotrode 29, and an anvil 32 (both shown schematically in FIG. 2), which are movable, crosswise to path A, between a closed configuration, and an open configuration in which they grip tightly and seal tube 2 at a relative cross section to seal packages 2.

Sonotrode 29 is a sealing tool which is vibrated by one or more disks of piezoelectric material. As described in detail below, the disks are supplied with alternating voltage, and generate mechanical vibration, the energy of which is related to the effective voltage supply value.

Jaws 12 and 13 (FIGS. 1 and 3) also comprise respective devices 33 for controlling the volume of packages 2 when sealing the packages. Each device 33, known for example from EP-B-0887265 and therefore not described in detail, substantially comprises a half-shell 34 hinged to main body 20, about an axis parallel to axes C, D, by two supporting brackets integral with half-shell 34.

As shown in FIG. 1, each half-shell 34 cooperates at the front with a complementary half-shell 34 to form a substantially parallelepiped-shaped cavity for housing a package 2 being formed. Each device 33 also comprises a cam follower roller 36 fitted idly to a supporting bracket in turn fitted integrally to the back of relative half-shell 34.

Cam follower rollers 36 of jaws 12 and 13 cooperate with respective cams 38 fitted to walls 8a and 8b of frame 6, and only the one associated with conveyor 11 is shown in FIG. 1.

The movement of jaws 12 and 13 is controlled by respective pairs of cams 40, 41 fitted to walls 8a, 8b of frame 6 and cooperating with respective pairs of cam follower rollers 42, 43 (FIG. 3) fitted to end enlargements 21, 22 of jaws 12 and 13. The rollers 42, 43 in each pair are coaxial respectively with pins 24, 23, and are offset axially with respect to each other, so as each to cooperate with the respective cam 40, 41.

More specifically, two pairs of cams 40, 41 (FIGS. 1 and 2) are fitted to wall 8a, and cooperate with respective pairs of rollers 42, 43 of jaws 13. Similarly, two pairs of cams 40, 41 are fitted to wall 8b, and cooperate with respective pairs of rollers 42, 43 of jaws 12.

Cams 40, 41 have respective substantially U-shaped portions 40a, 41a extending about top edges of respective walls 8a, 8b to define return portions, opposite respective drive wheels 16 and 26, for respective chains 15, 25 of conveyors 10, 11; and respective portions 40b, 41b extending along respective walls 8a, 8b, inside cavity 9. Portions 40a, 41a define portions $P_1$, $Q_1$, along which jaws 12 and 13 move towards and impact tube 3 of packaging material; and portions 40b, 41b define facing, substantially parallel portions $P_2$, $Q_2$ of the two paths P, Q, along which jaws 12 and 13 are maintained contacting under pressure to form the seals bounding packages 2 at respective substantially flat transverse sealing strips 44. A continuous strip is thus formed, comprising a number of parallelepiped-shaped container portions 45 connected to one another by transverse strips 44, which are cut either along path P or downstream from device 1 to form packages 2.

Cams 40, 41 release relative chains 15, 25 at respective portions $P_3$, $Q_3$ of paths P, Q, at the output of respective drive wheels 16, 26.

Along portions $P_3$, $Q_3$, chains 15, 25 cooperate with respective pairs of tensioners 46 for keeping chains 15, sufficiently taut to ensure contact between rollers 42, 43 of jaws 12, 13 and relative cams 40, 41.

Figure 3:
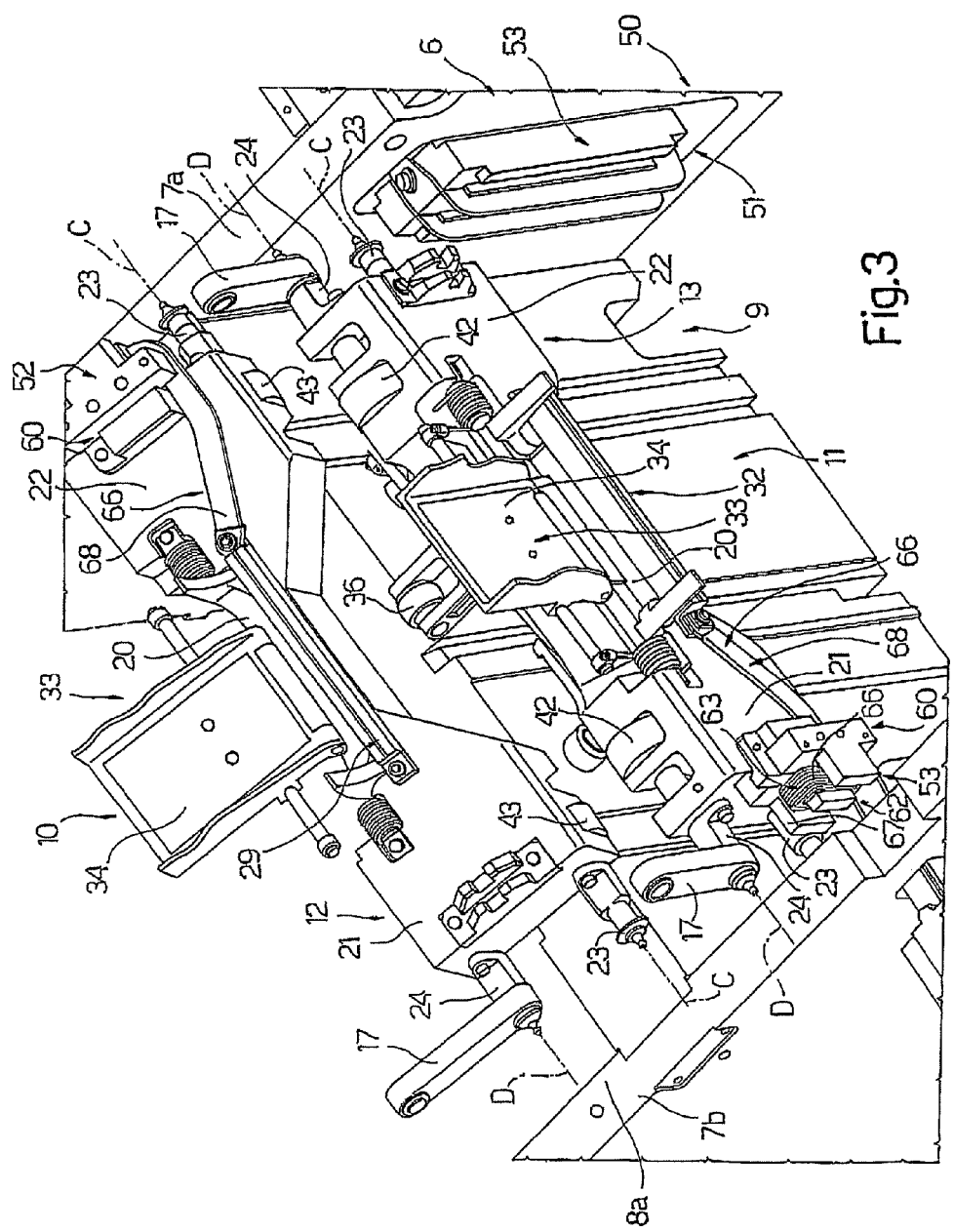
FIG. 3 shows a larger-scale view in perspective of part of the FIG. 1 sealing device.
Figure 5:
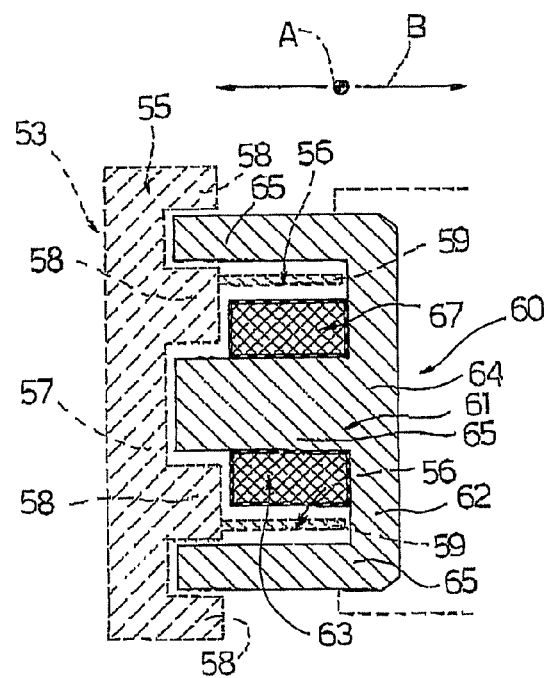
FIG. 5 shows a larger-scale section along line V-V in FIG. 4.

With particular reference to FIGS. 3, 4 and 5, device 1 also comprises an electromagnetic power unit 50 for supplying electric energy to sonotrode 29 of each jaw 12 along portion $P_2$ of path P.

Power unit 50 substantially comprises transmitting means 51 connected to a fixed electric energy source (not shown), e.g. an alternating voltage generator, and fitted integrally to frame 6; and receiving means 52 fitted to jaws 12 and receiving electric energy by electromagnetic induction from transmitting means 51 as jaws 12 travel past transmitting means 51.

More specifically, transmitting means 51 comprise two separate, facing transmitting units 53 fixed to respective sides 7a, 7b, inside cavity 9, and extending symmetrically on opposite sides of path A and portion $P_2$ of path P of jaws 12.

With reference to FIG. 4, each transmitting unit 53 is elongated in a direction parallel to path A and portion $P_2$ of path P, and substantially comprises a plastic supporting bracket 54; a fixed magnetic core 55; and a preferably copper primary winding 56 connected to the fixed electric energy source.

Fixed core 55 is defined by a rectangular plate elongated in the direction of path A and fixed to bracket 54 so as to project from bracket 54 inwards of cavity 9.

Fixed core 55 is made of magnetodielectric material, and comprises a parallelepiped-shaped base portion 57, from which a number of—in the example shown, four—parallel projections 58 project in direction B towards jaws 12 (FIG. 5).

Primary winding 56 comprises two elongated conducting plates 59 fixed to and projecting from respective central projections 58 of fixed core 55 so as to form an extension of projections 58 inwards of cavity 9.

Receiving means 52 comprise two sets of receiving units 60 fitted alternately to enlargements 21, 22 of respective jaws 12, 13, and which interact with respective transmitting units 53.

Each receiving unit 60 (FIGS. 3 and 4) projects from a relative enlargement 21, 22 of a relative jaw 12, 13, and substantially comprises a supporting bracket 61; a movable magnetic core 62; and a secondary winding 63—preferably defined by a cable comprising a number of insulated wires to reduce the effects of nonhomogeneous electric current distribution or "skin effect"—which receives electric energy by electromagnetic induction from primary winding 56 as receiving unit 60 travels past relative transmitting unit 53.

In the example shown, movable core 62 is defined by a body, which is preferably made of ferrite or other magneto-dielectric material, projects from relative enlargement 21, 22 of relative jaw 12, 13 towards relative side 7a, 7b of frame 6, and is preferably E-shaped in section in a plane perpendicular to path A.

More specifically, movable core 62 comprises a base portion 64 in the form of a rectangular plate, from which three parallel projections 65 project in direction B towards relative side 7a, 7b.

In the example shown, secondary winding 63 comprises a number of turns 66. And each turn 66 comprises an end portion 67 wound about the central projection 65 of movable coil 62 to form a coil; and an elongated portion 68 connecting relative end portion 67 to sonotrode 29.

Figure 6:
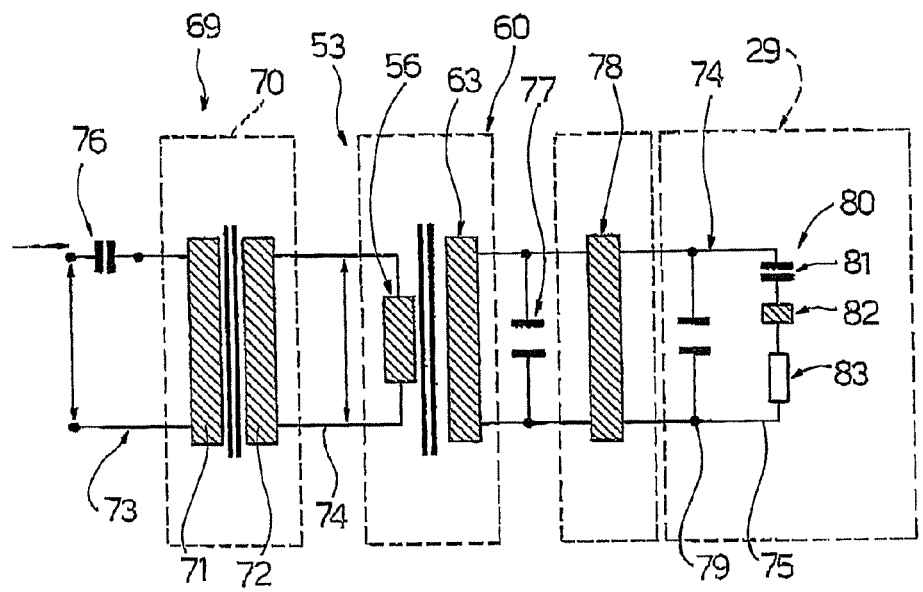
FIG. 6 shows a circuit diagram of a detail of the FIG. 1-3 sealing device.

Device 1 advantageously comprises transformer means (FIG. 6) supplied by the electric energy source with a first effective voltage value, and which supply primary winding 56 with a second effective voltage value lower than the first voltage value.

More specifically, the transformer means comprise a known transformer 70, in turn comprising first turns 71 and second turns 72 connected magnetically to one another in known manner by a core of magnetic material (not shown).

Device 1 comprises an electromagnetic circuit 69 for electromagnetically connecting the electric energy source, transformer 70, transmitting unit 53, and sonotrode 29.

Circuit 69 comprises first electric lines 73 connecting the electric energy source to first turns 71 of transformer 70; second electric lines 74 connecting second turns 72 of transformer 70 to primary winding 56; and third electric lines 75 connecting secondary winding 63 and sonotrode 29.

More specifically, first turns 71 are greater in number than second turns 72, so that the second effective voltage value supplied to second turns 72 of transformer 70 and, over lines 74, to primary winding 56, is lower than the first effective voltage value supplied by the electric energy source to first turns 71 of transformer 70.

The ratio of the number of first turns 71 to the number of second turns 72 depends on the desired ratio between the first effective voltage value supplied by the electric energy source to first turns 71, and the second effective voltage value supplied to second turns 72.

In the example shown, the ratio of the number of first turns 71 to the number of second turns 72 is 50.

Transformer 70 provides for supplying primary winding 56 of transmitting unit 53 with a second effective voltage value much lower than the first effective voltage value, so that electric energy is transferred by electromagnetic induction from primary winding 56 to secondary winding 63 with a low effective voltage value and a high effective electric current value, thus greatly reducing the risk of discharges in the damp, contaminated environment between primary winding 56 and secondary winding 63.

Primary winding 56 and secondary winding 63 are designed to induce in secondary winding 63 a third effective voltage value higher than the second effective voltage value and high enough to ensure correct, effective sealing by sonotrode 29.

In the example shown, the ratio of the third effective voltage value to the second effective voltage value is 50.

Circuit 69 also comprises a capacitor 76 series-connected electrically to the electric energy source along one of electric lines 73, and of such a capacitance as to balance the substantially inductive characteristics of first turns 71 of transformer 70, so that the second effective voltage value induced in second turns 72 is maximum around the oscillating frequency of the voltage supplied by the electric energy source.

Circuit 69 comprises a capacitor 77 parallel-connected electrically to secondary winding 63, and of such a capacitance as to balance the substantially inductive electromagnetic characteristics of secondary winding 63; and an inductor 78 parallel-connected electrically to capacitor 77, on the opposite side of capacitor 77 to secondary winding 63, and of such an inductance as to balance the electromagnetic characteristics of sonotrode 29 and the packaging material.

More specifically, the electromagnetic characteristics of sonotrode 29 and the packaging material are represented by a capacitor 79 parallel-connected electrically to inductor 78 and located on the opposite side of inductor 78 to capacitor 77; and by a series connection 80 of a capacitor 81, an inductor 82, and a resistor 83. Connection 80 is parallel-connected electrically to capacitor 79 on the opposite side of capacitor 79 to inductor 78.

By virtue of circuit 69, the effective voltage value supplied to sonotrode 29 is maximum around the oscillating frequency of the voltage induced in secondary winding 63.

The piezoelectric disks therefore vibrate sonotrode 29 at an amplitude sufficient to ensure correct, effective sealing.

Sealing device 1 operates as follows.

The two conveyors 10, 11 are rotated in opposite directions, as indicated by the arrows in FIG. 2, so that respective jaws 12 and 13 cooperate with tube 3 of packaging material from the end of respective portions $P_1$, $Q_1$ of paths P, Q and along respective portions $P_2$, $Q_2$ with a law of motion determined by the profiles of cams 40, 41.

Simultaneously with the movement of conveyors 10, 11, the electric energy source supplies first turns 71 of transformer 70 over lines 73.

Capacitor 76 balances the attenuating effect of the substantially inductive characteristics of first turns 71, so that the effective voltage value supplied to second turns 72 is maximum around the supply frequency of the electric energy source.

Transformer 70 transfers, and reduces the effective value of, the voltage from first turns 71 to second turns 72.

Second turns 72 supply the voltage to primary winding 56 over lines 74.

The operating cycle will now be described in more detail with reference to one jaw 12 of conveyor 10 and the corresponding jaw 13 of conveyor 11, all the jaws 12 and 13 obviously performing the same cycle at time intervals depending on the output rate.

Along portions $P_1$ and $Q_1$, jaws 12 and 13 are brought together to gradually deform and eventually "flatten" tube 3 at a transverse strip 44.

At the end of portions $P_1$, $Q_1$, devices 33 for controlling the volume of packages 2 are activated; and half-shells 34 of jaws 12 and 13 are brought together frontally to define a parallelepiped-shaped cavity defining the volume of container portion 45 of the package 2 being formed.

Along respective portions $P_2$, $Q_2$ of paths P, Q, jaws 12 and 13 are gripped firmly against tube 3, and receiving unit 60 of jaw 12 travels past relative transmission unit 53 and engages it in direction B.

More specifically, receiving unit 60 is positioned with respect to relative transmission unit 53 as shown in FIG. 5.

As jaw 12 travels along portion $P_2$ of path P, voltage is induced by primary winding 56 in secondary winding 63 of relative receiving unit 60, thus electrically powering sonotrode 29 which seals the two superimposed portions of the packaging material defining strip 44.

More specifically, the effective value of the voltage induced in secondary winding 63 is greater than the effective voltage value at second turns 72, so that sonotrode 29 is supplied over lines 74 with an effective alternating voltage value sufficient to ensure correct, complete sealing of the two portions of packaging material defining strip 44.

When powering sonotrode 29, capacitor 77 balances the attenuating effect of the substantially inductive characteristics of secondary winding 63, and inductor 78 balances the attenuating effect of the electromagnetic characteristics of sonotrode 29 and the packaging material, so that the effective voltage value supplied to sonotrode 29 is maximum around the frequency at which voltage is induced in secondary winding 63.

Upon receiving unit 60 disengaging relative transmission unit 53 at the end of portion $P_2$ of path P, or upon the required sealing energy value being reached, electric current induction in secondary winding 63 ceases; at which point, jaws 12 and 13 release the newly sealed strip 44 and withdraw from the strip of packages 2.

The advantages of device 1 and the method according to the present invention will be clear from the foregoing description.

In particular, sealing device 1 provides for correct, complete sealing of the portions of packaging material forming strip 44, thus reducing the risk of discharges between primary winding 56 and secondary winding 63.

Transformer 70, in fact, supplies second turns 72 with a lower effective voltage value and a higher effective electric current value than those supplied by the electric energy source to first turns 71.

Electric energy is thus supplied by second turns 72 to primary winding 56 mainly in the form of alternating electric current and to a lesser degree in the form of alternating voltage.

Low effective voltage values therefore pass between primary winding 56 and secondary winding 63, thus greatly reducing the risk of electric discharges, particularly as regards primary winding 56.

Moreover, the current induced in secondary winding 63 and, hence, the voltage supplied to sonotrode 29 being particularly high, by being proportional to the electric current in primary winding 56, sonotrode 29 can easily be supplied with the high voltage values required for correct, complete sealing.

Clearly, changes may be made to sealing device 1 and the method described without, however, departing from the protective scope defined in the accompanying Claims.

In particular, device 1 may feature only one or two pairs of jaws 12, 13 acting cyclically on tube 3 of packaging material.

As opposed to being series-connected over lines 73, capacitor 76 may be parallel-connected electrically to first turns 71 of transformer 70.

Finally, circuit 69 need not necessarily comprise capacitors 76, 77 and/or inductor 78. Whether or not capacitors 76, 77 or inductor 78 are employed depends on the electromagnetic characteristics of sonotrode 29 and on the particular configuration of primary winding 56 and secondary winding 63.

The invention claimed is:

1. A sealing method for producing sealed packages from a tube of sheet packaging material fed along a path and filled continuously with a pourable food product; the method comprising:

moving a pair of opposite jaws cyclically with respect to a supporting frame and along part of said path to grip said tube of packaging material tightly at equally spaced cross sections;

sealing said tube of packaging material at said cross sections by ultrasonic sealing means;

supplying electric energy to said sealing means by way of at least a primary winding fixed to said frame alongside said path and connectable to an electric energy source; and a secondary winding carried by said first jaw, supplying said sealing means, and receiving electric energy by electromagnetic induction from said primary winding as said first jaw travels past the primary winding; and supplying transformer means, by way of said electric energy source, with a first voltage value, and supplying said primary winding, by way of said transformer means, with a second voltage value lower than said first voltage value, wherein the secondary winding receives electric energy from the primary winding with a third voltage value higher than the second voltage value.

2. A sealing device for producing sealed packages from a tube of sheet packaging material fed along a path and filled continuously with a pourable food product, said sealing device comprising:

a supporting frame;

at least one pair of opposite jaws movable cyclically with respect to said frame and along part of said path to grip said tube of packaging material tightly at equally spaced cross sections;

ultrasonic sealing means carried by a first of said jaws to seal said tube of packaging material at said cross sections;

electromagnetic power means for supplying electric energy to said sealing means, said power means comprising at least a primary winding fixed to said frame alongside said path and connectable to an electric energy source; and a secondary winding carried by said first jaw, supplying said sealing means, and receiving electric energy by electromagnetic induction from said primary winding as said first jaw travels past the primary winding; and transformer means supplied by said electric energy source with a first voltage value, and supplying said primary winding with a second voltage value lower than said first voltage value, wherein said secondary winding receives electric energy from said primary winding with a third voltage value higher than said second voltage value.

3. A device as claimed in claim 2, comprising an electromagnetic circuit connecting said electric energy source to said transformer means, and said secondary winding to said sealing means; said circuit comprising electromagnetic compensating means for balancing attenuation caused by said transformer means, by said sealing means, and by said primary and secondary winding, so that the voltage supplied to the sealing means is maximum around the supply frequency of said electric energy source.

4. A device as claimed in claim 3, wherein said electromagnetic compensating means comprise an inductor connected electrically to said sealing means and to said secondary winding, and for balancing attenuation caused by said sealing means.

5. A device as claimed in claim 3, wherein said electromagnetic compensating means comprise a capacitor connected electrically to said secondary winding and to said sealing means, and for balancing attenuation caused by said secondary winding.

6. A device as claimed in claim 3, wherein said transformer means comprise at least one transformer having first turns connected electrically to said electric energy source, and second turns connected electrically to said primary winding; and in that said electromagnetic compensating means comprise a capacitor connected electrically to said electric energy source and to said first turns, and for balancing attenuation caused by said transformer.

7. A device as claimed in claim 2, comprising an electromagnetic circuit connecting said electric energy source to said transformer means, and said secondary winding to said sealing means; said circuit comprising electromagnetic compensating means for balancing attenuation caused by said transformer means, by said sealing means, and by said primary and secondary winding, so that the voltage supplied to the sealing means is maximum around the supply frequency of said electric energy source.

8. A sealing device for producing sealed packages from a tube of sheet packaging material fed along a path and filled continuously with a pourable food product, said sealing device comprising:
  a supporting frame;
  a first jaw and a second jaw positioned in opposing relation to one another to grip the tube of packaging material tightly at equally spaced cross sections and cyclically movable relative to the supporting frame along part of the path;
  a mechanical vibration generator carried by the first jaw to seal the tube of packaging material at the cross sections;
  a power unit connected to the mechanical vibration generator, the power unit comprising:
    at least a primary winding fixed to the supporting frame and connectable to an electric energy source; and
    a secondary winding carried by the first jaw, supplying the mechanical vibration generator, and receiving electric energy by electromagnetic induction from the primary winding as the first jaw moves past the primary winding; and
  a transformer supplied by the electric energy source with a first voltage value, and supplying the primary winding with a second voltage value lower than the first voltage value,
  wherein the secondary winding receives electric energy from the primary winding with a third voltage value higher than the second voltage value.

9. A device as claimed in claim 8, comprising an electromagnetic circuit connecting the electric energy source to the transformer and connecting the secondary winding to the mechanical vibration generator.

10. A device as claimed in claim 9, wherein the electromagnetic circuit comprises a first capacitor, a second capacitor parallel-connected electrically to the secondary winding, and an inductor parallel-connected electrically to the second capacitor on a side of the second capacitor opposite the secondary winding.

11. A device as claimed in claim 9, wherein the transformer comprises first turns and second turns, the second turns being electrically connected to the primary winding.

12. A device as claimed in claim 8, wherein the transformer comprises first turns and second turns, the second turns being electrically connected to the primary winding.

* * * * *